United States Patent
Spiegel et al.

(10) Patent No.: US 12,056,472 B2
(45) Date of Patent: Aug. 6, 2024

(54) USER INTERFACE BEHAVIOR BASED RULES GENERATION

(71) Applicant: ENTIT Software LLC, Sunnyvale, CA (US)

(72) Inventors: Ofer Spiegel, Yehud (IL); Efrat Egozi Levi, Yehud (IL); Gil Nakache, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 612 days.

(21) Appl. No.: 15/752,981

(22) PCT Filed: Aug. 18, 2015

(86) PCT No.: PCT/US2015/045723
§ 371 (c)(1),
(2) Date: Feb. 15, 2018

(87) PCT Pub. No.: WO2017/030566
PCT Pub. Date: Feb. 23, 2017

(65) Prior Publication Data
US 2018/0246705 A1    Aug. 30, 2018

(51) Int. Cl.
*G06F 8/38* (2018.01)
*G06F 9/44* (2018.01)
(Continued)

(52) U.S. Cl.
CPC .................. *G06F 8/38* (2013.01); *G06F 9/44* (2013.01); *G06F 9/451* (2018.02); *G06N 5/04* (2013.01)

(58) Field of Classification Search
CPC .............. G06F 8/38; G06F 9/451; G06F 9/44; G06N 5/04
(Continued)

(56) References Cited

U.S. PATENT DOCUMENTS

| 7,334,216 B2 * | 2/2008 | Molina-Moreno ....... G06F 8/35 717/109 |
| 7,653,896 B2 | 1/2010 | Herdeg, III |

(Continued)

FOREIGN PATENT DOCUMENTS

| WO | WO-03073344 A2 | 9/2003 |
| WO | WO2005111850 | 11/2005 |

OTHER PUBLICATIONS

International Search Report and Written Opinion dated Jun. 17, 2016, PCT Patent Application No. PCT/US2015/045723 dated Aug. 18, 2015, Korean Intellectual Property Office.
(Continued)

*Primary Examiner* — Michael Roswell
*Assistant Examiner* — Tionna M Burke
(74) *Attorney, Agent, or Firm* — Sheridan Ross P.C.

(57) ABSTRACT

According to an example, user interface (UI) behavior based rules generation may include ascertaining data related to an application UI for a specified version of an application, and ascertaining context elements included in the data related to the application UI. UI behavior based rules generation may include ascertaining values associated with the context elements, and generating context combinations based on the context elements and the values associated with the context elements. UI behavior based rules generation may include determining a truth table for the application UI based on an analysis of fields of the application UI and corresponding context combinations, and generating, based on an analysis of the truth table, a rule that identifies customization of the specified version of the application.

18 Claims, 13 Drawing Sheets

(51) Int. Cl.
  *G06F 9/451* (2018.01)
  *G06N 5/04* (2023.01)
(58) Field of Classification Search
  USPC .......................................................... 715/762
  See application file for complete search history.

(56) References Cited

U.S. PATENT DOCUMENTS

| | | |
|---|---|---|
| 7,765,190 B1 | 7/2010 | Bingham et al. |
| 8,914,773 B2 * | 12/2014 | Allen ................ G06F 16/90339 717/109 |
| 2007/0282896 A1 | 12/2007 | Wydroug et al. |
| 2010/0262929 A1 | 10/2010 | Avery |
| 2014/0108977 A1 * | 4/2014 | Queck ..................... G06F 9/451 715/765 |
| 2015/0067531 A1 | 3/2015 | Adimatyam et al. |
| 2015/0227265 A1 | 8/2015 | Harnesk |

OTHER PUBLICATIONS

Kennard, R. et al., "Towards a General Purpose Architecture for UI Generation," (Research Paper), May 13, 2010.

\* cited by examiner

Context Elements and Values

Customer Type: Retail, Wholesale

Customer Region: West, Mid, East

Order Status: New, In Progress, Competed Cancelled

Order Total: 0-1,000, 1001-5,000, 5,001-10,000

FIG. 4

| Context Combination | Customer Type | Customer Region | Order Status | Order Total |
|---|---|---|---|---|
| 1 | Retail | West | New | 0-1,000 |
| 2 | Retail | West | New | 1001-5,000 |
| 3 | Retail | West | New | 5,001-10,000 |
| 4 | Retail | West | In Progress | 0-1,000 |
| 5 | Retail | West | In Progress | 1001-5,000 |
| 6 | Retail | West | In Progress | 5,001-10,000 |
| 7 | Retail | West | Completed | 0-1,000 |
| 8 | Retail | West | Completed | 1001-5,000 |
| 9 | Retail | West | Completed | 5,001-10,000 |
| 10 | Retail | West | Cancelled | 0-1,000 |
| 11 | Retail | West | Cancelled | 1001-5,000 |
| 12 | Retail | West | Cancelled | 5,001-10,000 |
| 13 | Retail | Mid | New | 0-1,000 |
| 14 | Retail | Mid | New | 1001-5,000 |
| 15 | Retail | Mid | New | 5,001-10,000 |
| 16 | Retail | Mid | In Progress | 0-1,000 |
| 17 | Retail | Mid | In Progress | 1001-5,000 |
| 18 | Retail | Mid | In Progress | 5,001-10,000 |
| 19 | Retail | Mid | Completed | 0-1,000 |
| 20 | Retail | Mid | Completed | 1001-5,000 |
| 21 | Retail | Mid | Completed | 5,001-10,000 |
| 22 | Retail | Mid | Cancelled | 0-1,000 |
| 23 | Retail | Mid | Cancelled | 1001-5,000 |
| 24 | Retail | Mid | Cancelled | 5,001-10,000 |
| ... | ... | ... | ... | ... |
| ... | ... | ... | ... | ... |
| 71 | Wholesale | East | Cancelled | 1001-5,000 |
| 72 | Wholesale | East | Cancelled | 5,001-10,000 |

FIG. 5

| Context Combination | Field 1 | Field 2 | Field 3 | Field N |
|---|---|---|---|---|
| 1 | Tab Order=1<br>Label=ID<br>Read=True<br>Needed=True | Tab Order=2<br>Label=Name<br>Read=False<br>Needed=True | Tab Order=0<br>Label=Owner<br>Read=False<br>Needed=False | Tab Order=3<br>Label=Path<br>Read=False<br>Needed=False |
| 2 | Tab Order=1<br>Label=ID<br>Read=True<br>Needed=True | Tab Order=2<br>Label=ID<br>Read=False<br>Needed=True | Tab Order=3<br>Label=Owner<br>Read=False<br>Needed=True | Tab Order=4<br>Label=Path<br>Read=False<br>Needed=False |
| 3 | Tab Order=1<br>Label=ID<br>Read=True<br>Needed=True | Tab Order=2<br>Label=ID<br>Read=False<br>Needed=True | Tab Order=3<br>Label=Owner<br>Read=False<br>Needed=True | Tab Order=4<br>Label=Path<br>Read=False<br>Needed=False |
| ... | ... | ... | ... | ... |

FIG. 6

| | |
|---|---|
| Human Readable Output | "Approving Manager field is needed when Customer Type is Retail and (Order Status is New or Customer Region is West)" ← 800<br><br>"Make [Approving Manager] needed when [Customer Type]='Retail' and (Order Status='New' or Customer Region='West')" ← 802<br><br>"Make [Partner Code] field needed when [Customer Type] is [Partner]" ← 804<br><br>"Make [Customer Name] field Read when [UserGroup] is not [Admin] and [Customer Status] is Not New" ← 806<br><br>"Make [Partner Info] tab Visible when [Customer Type] is [Partner]" ← 808 |

FIG. 8

| | |
|---|---|
| Machine Readable Output (Example JSON format) | ```
{"rules:"{
"rule": {
    "field": "Approving Manager",
    "attribute": "needed",
    "condition": [
        {"customer_type": "retail","AND"
            {"order_status": "new", "OR"
                "customer_region": "west"}}
    ]
}
}

{"rules:"{
"rule": {
    "field": "Partner Code",
    "attribute": "needed",
    "condition": [
        {"customer_type": "partner"}
    ]
}
}
"rule": {
    "field": "Customer Name",
    "attribute": "readonly",
    "condition": [
        {"user_group": "NOT","ADMIN", "AND"}
        {"customer_status": "new"}
    ]
}
}
"rule": {
    "tab": "Partner Info",
    "attribute": "visible",
    "condition": [
        {"customer_type": "partner"}
    ]
}
}
}
``` — 810, 812, 814, 816 |

FIG. 8 (CONT)

USER INTERFACE BEHAVIOR BASED RULES GENERATION

BACKGROUND

An application may be described as a set of machine readable instructions designed to permit a user to perform a group of coordinated functions, tasks, or activities. Examples of an application include a word processor, a video media streaming application, an audio media streaming application, a file transfer application, a spreadsheet design and management application, an aeronautical flight simulator, a console game, a drawing application, a painting application, an illustrating application, a library management application, and other types of applications. A user may customize various functionalities associated with an application based on user preferences, and other types of policies.

BRIEF DESCRIPTION OF DRAWINGS

Features of the present disclosure are illustrated by way of example and not limited in the following figure(s), in which like numerals indicate like elements, in which:

FIG. 4 illustrates context elements for the UI behavior based rules generation apparatus of FIG. 1, according to an example of the present disclosure;

FIG. 5 illustrates context combinations for the UI behavior based rules generation apparatus of FIG. 1, according to an example of the present disclosure;

FIG. 6 illustrates a sample of "recording" log results for the UI behavior based rules generation apparatus of FIG. 1, according to an example of the present disclosure;

FIG. 8 illustrates a result output for the UI behavior based rules generation apparatus of FIG. 1, according to an example of the present disclosure;

DETAILED DESCRIPTION

Figure 1:
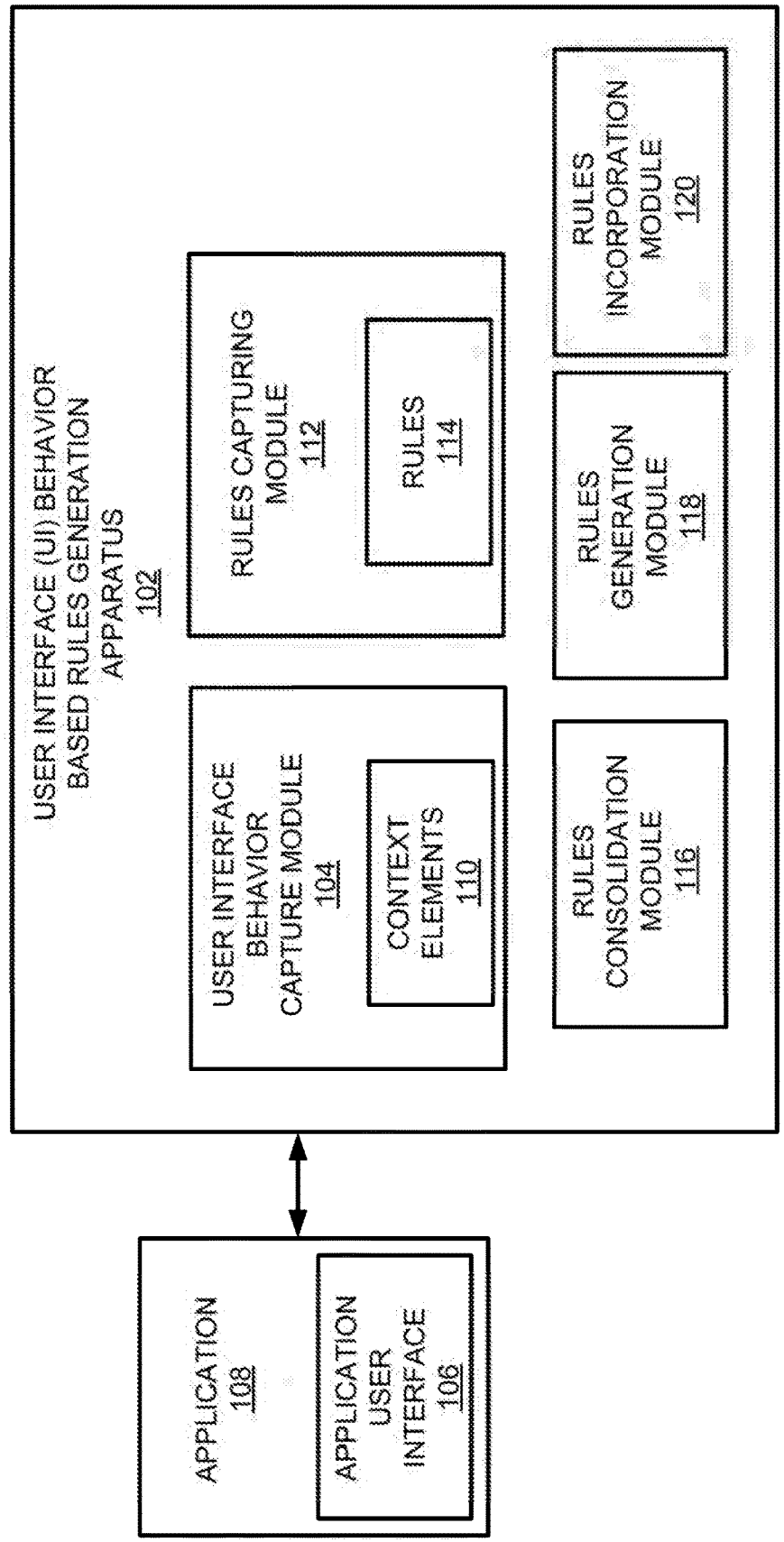
FIG. 1 illustrates an environment including a user interface (UI) behavior based rules generation apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Off-the-shelf applications may be described as applications that provide the same functionality and behavior to all users. For such applications, and applications generally, a user may customize various functionalities associated with an application based on user preferences. For enterprise environments, examples of such applications may include enterprise resource planning (ERP) systems such as Systems, Applications and Products in Data Processing (SAP), customer relationship management (CRM) systems, applications related to multitenant deployments and maintenance in Software as a Service (SaaS) or information technology (IT), etc.

An application may include various means to customize the application to fit specific methodologies and workflows related to a particular user, a user role, a department, and/or an organization. Such customization may include, for example, adding additional data elements (e.g., fields), designing a data entry form (e.g., the collection of fields to be displayed and their order), setting fields' attributes statically or dynamically, defining transition flows, defining custom actions, and performing other such modifications. With respect to adding additional data elements, according to an example, a CRM system may be differentiated between a customer and a partner, where a data element for a partner may include a partner indication field (e.g., a checkbox) and a partner identification (ID) field. With respect to designing a data entry form, according to an example, for an order form in which a recipient may be marked as partner, once the recipient is marked as partner, the partner ID field may be displayed. With respect to setting fields' attributes statically or dynamically, according to an example, when an order total is higher than a predetermined value, a field for approval, for example, by an account manager, may be displayed. With respect to defining transition flows, according to an example, when an order total is higher than a predetermined value, an authorized personnel (e.g., an approving account manager) may move the order to a confirmed status. With respect to defining custom actions, according to an example, a custom action may include adding an action button to an employee card which provides for a user to open an employee's profile page (e.g., on a website).

With respect to customization of applications, a greater level of customization of an application may mean that the application provides a user greater flexibility to tailor the application to fit the user's needs. In this regard, from a user satisfaction viewpoint, a greater flexibility to tailor the application may result in higher user satisfaction, and also result in a product that is user-specific.

With respect to customization of applications, in certain cases, the customization may be based on a particular customization framework provided by an application developer. In other cases, a user and/or an application vendor may choose to redesign the customization implementation and switch from one customization framework to another. The user may also choose to switch from one application to another.

When the customization is redesigned for the sake of newer product releases, a gap may be created between a previous framework of an application and a new framework of the application, and at times, this gap may not be readily overcome. In this regard, users that are using a previous version of an application may not be able to migrate their customization to the framework of a new version of the application.

In order to address the aforementioned technical challenges with respect to preserving of customization between different versions of an application based on a same technology, or between different versions of an application based on different types of technologies (e.g., change of an application from Microsoft Windows client to HyperText Markup Language (HTML), or to mobile native clients, or to cloud based deployments, etc.), a UI behavior based rules generation apparatus and a method for UI behavior based rules generation are disclosed herein. The apparatus and method disclosed herein may provide for migration of a user from one customized application to another, for example, by replicating the dynamic UI customization performed in one application, based on a technique that accounts for the underlying technology of each application.

For the apparatus and method disclosed herein, a UI behavior capture module that is executed by a hardware processor may capture application UI behavior to generate a truth table with multiple rows and columns. A truth table may use a Boolean expression (e.g., True/False, 1/0, etc.) for every attribute (i.e., the truth table may represent all cases that render an attribute to be True or False) of an application, where the attribute may include displayed and/or non-displayed attributes. For example, with respect to product shipment for different countries, use or non-use of a particular type of shipping method may be specified as True/False, where the True/False status may be used to discern other related attributes with respect to the different countries (e.g., types of countries, locations of countries, etc.).

A rules capturing module that is executed by the hardware processor may apply a decision tree technique to efficiently and accurately capture rules to describe captured data related to the application UI behavior.

A rules consolidation module that is executed by the hardware processor may perform consolidation on the decision tree to further consolidate the rules. The rules consolidation module may consolidate the decision tree to generate distilled rules that describe the dynamic behavior of every relevant dynamic application UI attribute based on the varying contexts. The distilled rules may be used to provide, for example, an application owner with a list of popular distilled rules as suggested rules for "best practice customizations". Further, the distilled rules may be used to determine whether a difference between a rule and between similar known distilled rules may suggest that the difference is a typographical error or a new rule customization.

With respect to distilled rules, a rule that includes several conditions may be highly complex. For example, a rule may specify "Ship Method" read-based is True when: destination country=Britain AND is customer premium=no AND product type=book OR destination country=France AND is customer premium=no AND product type=toy AND destination country=Spain AND is customer premium=no AND product type=toy ... etc." In this regard, such a rule may be distilled to shorten the rule to its minimal size to retain all of the states and cases listed in a truth table, which in this example may be specified as "Ship Method" read-based is True when: destination country=United states OR is customer premium=yes" (i.e., where the truth table for this example includes shipping methods for a variety of countries including Britain, France, Spain, the United States, etc.).

With respect to a dynamic UI attribute, a dynamic UI attribute may be described as any element of an application that defines the layout and behavior of an application UI, such as an entry form (e.g., a collection of displayed fields, the order of the displayed fields, if fields are read-based, if fields are mandatory, if fields are colored, etc.).

A rules generation module that is executed by the hardware processor may generate the distilled rules as a human readable rule definition. For example, the human readable rule definition may be specified as "Make [Partner Code] field Needed when [Customer Type] is [Partner]", where "Partner Code", "Customer Type", and "Partner" may represent fields or values in the fields for an application UI. Alternatively or additionally, the rules generation module may generate the rules as a proprietary format (e.g., a machine readable format) that a system may load and implement. For example, the proprietary format may be specified as:

```
{"rule": {
    "field": "Partner Code",
    "attribute": "needed",
    "condition": [
        {"customer_type": "partner"}
    ]
  }
}
```

A rules incorporation module that is executed by the hardware processor may incorporate the rules (e.g., the machine readable format) directly into a new version of the application.

According to examples, the apparatus and method disclosed herein may provide for rules that facilitate discernment of the logic of an application UI dynamic nature regardless of the underlying technology. Further, the rules may facilitate redefining of the dynamic UI behavior of an application in a new different system to match the dynamic UI behavior of the application of a previous system.

According to examples, the apparatus and method disclosed herein may provide for an application vendor and/or an application user to operate an application independently from the constraints of the underlying technology. For example, the apparatus and method disclosed herein may provide for an application vendor and/or an application user to operate an application independently from the framework of an application that is used to customize the application.

According to examples, the apparatus and method disclosed herein may provide for restructuring of an application customization by an application vendor without the vendor being concerned with the implications of the restructuring.

According to examples, the apparatus and method disclosed herein may provide for an application user to retain any past customization investment that was made in a previous system that uses the application (e.g., a previous version of the application), and retain the benefit from that investment in a new system that uses the application (e.g., a new version of the application).

According to examples, the apparatus and method disclosed herein may provide for an application vendor to retain a customization related to an application, and facilitate seamless transition of an application user between one system that uses the application to another system that uses the application.

According to examples, the apparatus and method disclosed herein may provide for verbalization (e.g., based on the human readable rules as disclosed herein) of the dynamic nature of an application to be part of the application documentation for various potential auditing needs.

According to examples, the apparatus and method disclosed herein may provide for fine tuning of the customization logic (e.g., by a customization administrator) based on an actual outcome of the system behavior by comparing the generated rules against an actual customization definition.

Figure 2:
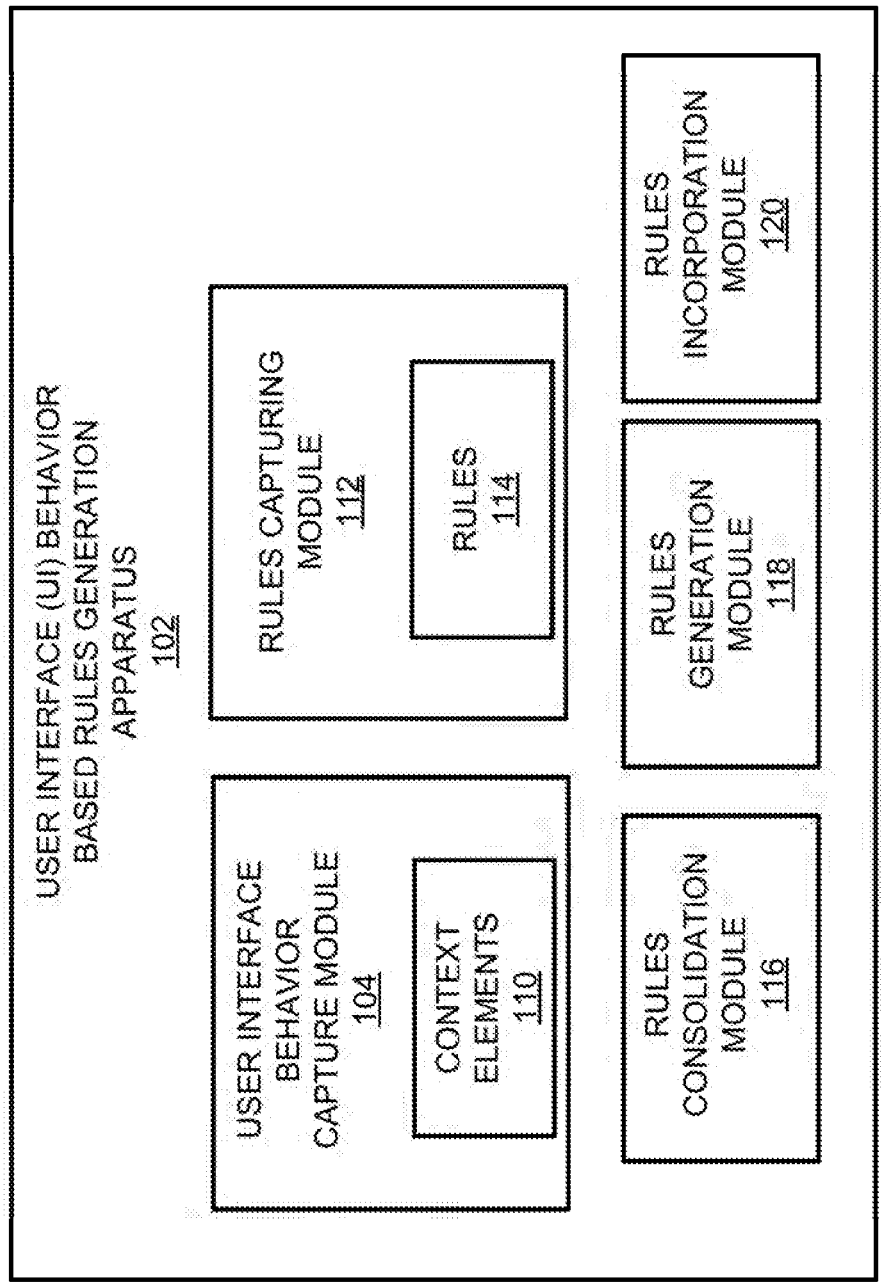
FIG. 2 illustrates an architecture of the UI behavior based rules generation apparatus of FIG. 1, according to an example of the present disclosure.
Figure 3:
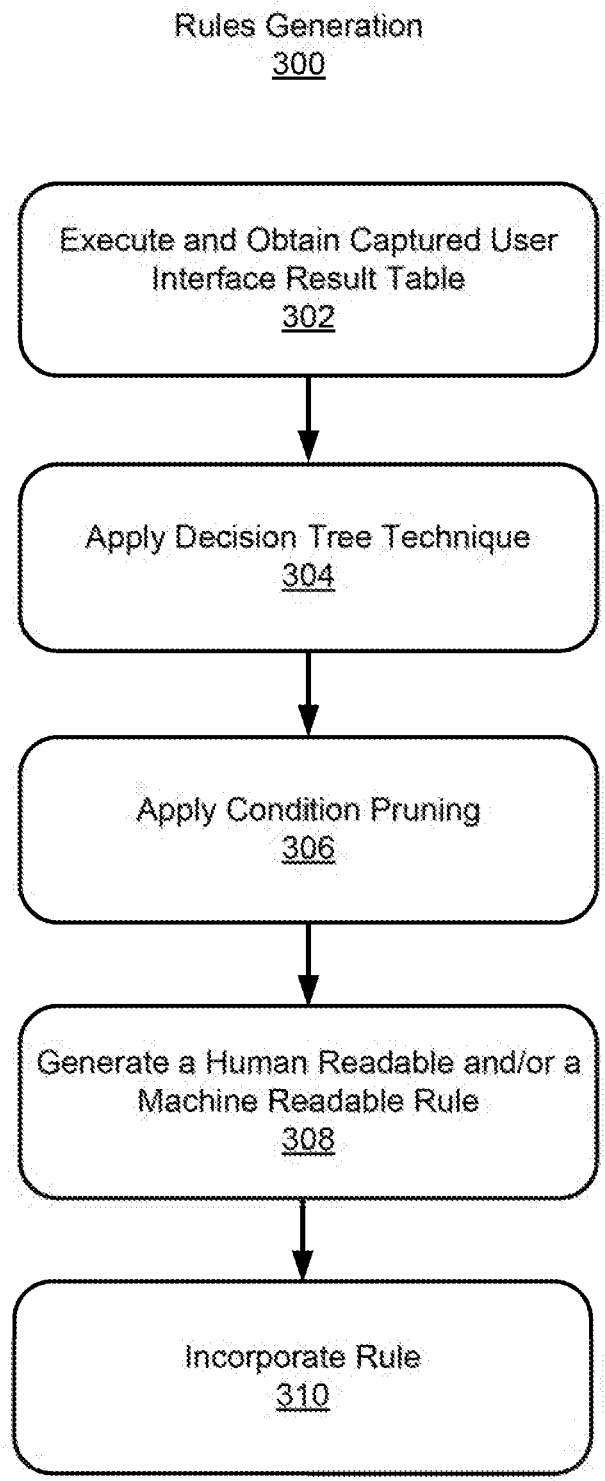
FIG. 3 illustrates a flowchart for rules generation for the UI behavior based rules generation apparatus of FIG. 1, according to an example of the present disclosure.

FIG. 1 illustrates an environment 100 including a UI behavior based rules generation apparatus 102 (hereinafter also referred to as "apparatus 102"), according to an example of the present disclosure. FIG. 2 illustrates an architecture of the apparatus 102, according to an example of the present disclosure. FIG. 3 illustrates a flowchart 300 for rules generation for the apparatus 102, according to an example of the present disclosure.

Referring to FIG. 1 (see also FIG. 2, and block 302 of FIG. 3), the apparatus 102 is depicted as including a UI behavior capture module 104 that may ascertain (e.g., by determining, receiving, or other such techniques) application UI 106 behavior for a given version of an application 108 (e.g., a version at which the application 108 has been customized by a user). For example, the UI behavior capture module 104 may ascertain data related to the application UI 106.

The UI behavior capture module 104 may execute the flow of captured UI behavior by setting a collection of context elements 110 that are ascertained from the data related to the application UI 106, an example of which is disclosed herein with reference to FIG. 4. The context elements 110 may be described as elements that define the dynamic nature of the application UI 106. The context elements 110 may be ascertained, for example, by being defined by a user of the apparatus 102, by retrieval from a predetermined set of context elements from a database of similar applications, based on machine learning with respect to a combination of the definition of the context elements and retrieval of the predetermined set of context elements, and other such techniques.

The UI behavior capture module 104 may ascertain associated values for the context elements 110 from the captured application UI 106 behavior for the given version of the application 108. Alternatively or additionally, the values of the context elements 110 may also be defined, for example, as ranges (e.g., 0-1000, 1001-5000, etc.) as disclosed herein with reference to FIG. 4.

For example, FIG. 4 illustrates context elements for the apparatus 102, according to an example of the present disclosure.

Referring to FIG. 4, the UI behavior capture module 104 may execute the flow of captured application UI 106 behavior by setting a collection of context elements 110 including "customer type", "customer region", "order status", and "order total". In this regard, the UI behavior capture module 104 may determine associated values for the context elements from the captured application UI 106 behavior for the given version of the application 108. For example, associated values for the "customer type" context element may include "retail" and "wholesale" as illustrated in FIG. 4.

The UI behavior capture module 104 may generate context combinations, an example of which is disclosed herein with reference to FIG. 5. In this regard, the UI behavior capture module 104 may determine all possible combinations involving each value between the different context elements. For example, if a context element A includes values A1 and A2, and a context element B includes values B1 and B2, the context combinations may include (A1, B1), (A2, B1), (A1, B2), and (A2, B2).

According to examples, FIG. 5 illustrates context combinations for the apparatus 102, according to an example of the present disclosure.

Referring to FIG. 5, for the example of FIG. 4, the context element values may result in a total of seventy-two context combinations. For example, a first context combination may include "customer type—retail", "customer region—west", "order status—new", and "order total 0-1000", a second context combination may include "customer type—retail", "customer region—west", "order status—new", and "order total 1001-5000", etc.

The UI behavior capture module 104 may capture relevant attributes of the application UI 106 for each of the context combinations, an example of which is disclosed herein with reference to FIG. 6. For example, for each of the fields of the application UI 106 listed in the truth table of FIG. 6, the UI behavior capture module 104 may determine attributes such as a "tab order" of a field (e.g., order of the field by which a tab is used to move from one field to another), a "label" associated with the field (e.g., where a label may represent text that precedes an entry field), whether the field is a "read" field (e.g., a field that is not editable, as opposed to a "write" field), and whether the field is "needed" (i.e., the field is to be completed before proceeding to another field or page of the application UI 106). Other examples of attributes may include color, size, shape, location, etc., and generally any aspect of an application UI 106 that is to be analyzed. The attributes that are captured by the UI behavior capture module 104 may generally represent dynamic attributes of various fields (i.e., areas of the application UI where a value may be entered by a user of the application 108, where a value may be selected by scrolling, where a value may not be entered, etc.) of the application UI 106. The fields and/or attributes of the application UI 106 may be identified by a user of the apparatus 102, based on machine learning related to the apparatus 102, based on predetermined sets of fields and/or attributes for similar applications, and other such techniques.

Based on the captured attributes of the application UI 106 for each of the context combinations, the UI behavior capture module 104 may generate a truth table representing the captured application UI 106 behavior.

The context elements 110 may represent all of the fields or a subset of the fields of the application UI 106. Moreover, the context elements 110 may drive the dynamic nature of the application UI 106, and the fields may be affected by the dynamic nature of the context elements.

According to examples, FIG. 6 illustrates a sample of "recording" log results for the apparatus 102, according to an example of the present disclosure.

Referring to FIG. 6, for the example of FIGS. 4 and 5, with respect to context combination 1, for field 1 (i.e., "customer type"), the UI behavior capture module 104 may determine the "tab order" of the field-1 as "1", the "label" associated with the field-1 as "ID", whether the field-1 is a "read" field as "true", and whether the field-1 is "needed" as "true", etc., for further context combinations and associated fields.

Referring to FIG. 1 (see also FIG. 2, and block 304 of FIG. 3), a rules capturing module 112 may apply a decision tree technique to efficiently and accurately capture rules 114 to describe captured data related to the captured UI behavior. In this regard, the rules capturing module 112 may apply a decision tree technique of the resulting truth table (e.g., a truth table determined from the True/False data of FIG. 6) to generate the basic condition of every dynamic UI attribute of the UI context elements 110, an example of which is disclosed herein with reference to FIG. 7. The decision tree may represent an overall combination of context elements that reflects specific attributes of specific fields.

Figure 7:
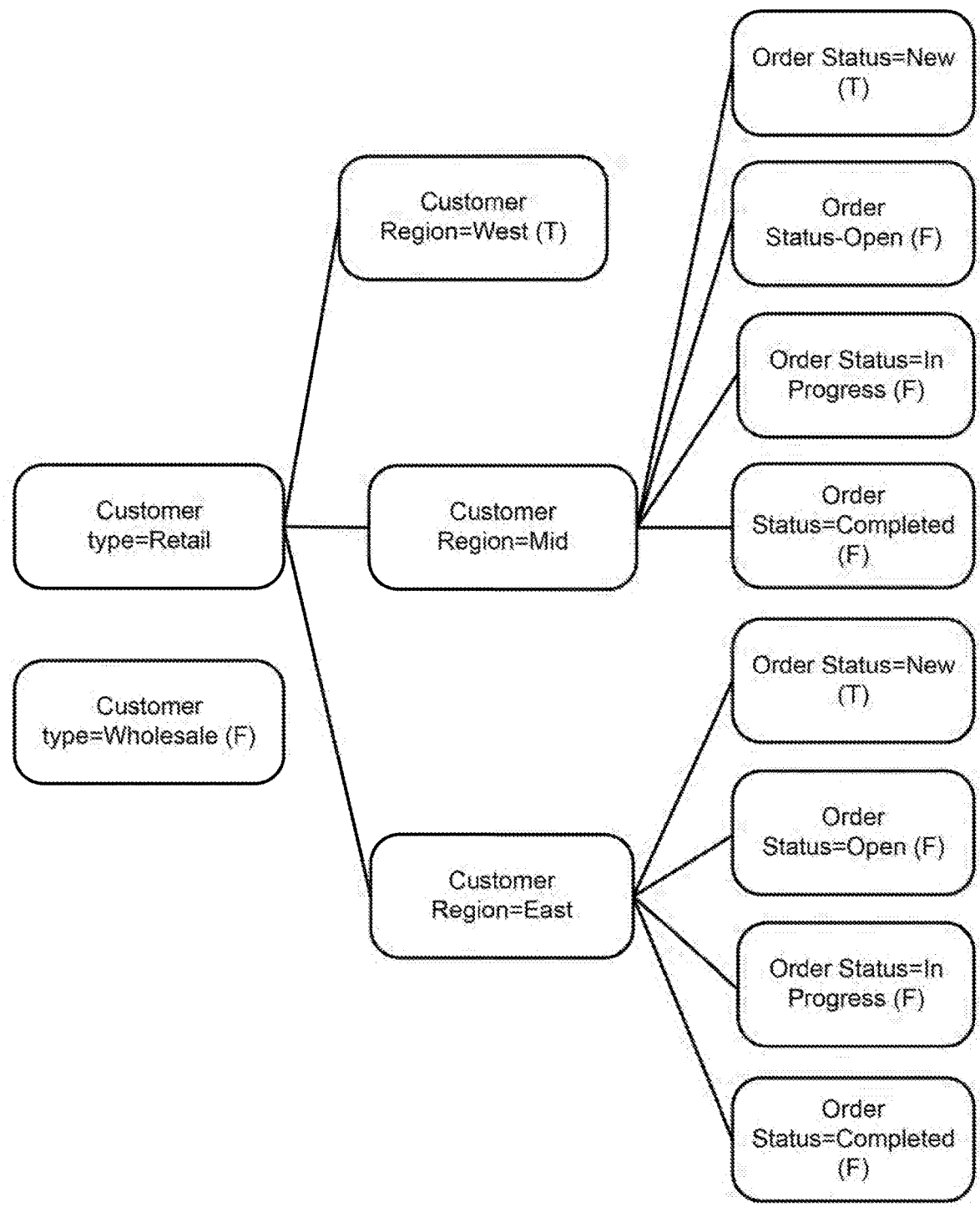
FIG. 7 illustrates a truth graph of a particular UI context element and attribute condition for the UI behavior based rules generation apparatus of FIG. 1, according to an example of the present disclosure.

For example, FIG. 7 illustrates a truth graph of a particular UI context element and attribute condition for the apparatus 102, according to an example of the present disclosure.

Referring to FIG. 7, for the example of FIGS. 4-6, the rules capturing module 112 may apply a decision tree technique of the resulting truth table to generate the basic condition of every dynamic application UI 106 attribute of the UI context elements 110. For example, as shown in FIG. 7, a partial decision tree as shown may include a first column that represents the context element "customer type" and its associated values (e.g., retail, wholesale), a second column that represents the context element "customer region" and its associated values, a third column that represents the context element "order status" and its associated values, etc. For each of the context elements, the rules capturing module 112 may apply the decision tree technique to generate the basic condition of every dynamic UI attribute of the UI context elements 110. According to an example, the decision tree of FIG. 7 may be read to indicate "customer type is retail is true when customer region is west, or customer region is mid and order status is new".

Referring to FIG. 1 (see also FIG. 2, and block 306 of FIG. 3), a rules consolidation module 116 may perform consolidation of the decision tree to thus consolidate the rules as disclosed herein to generate distilled rules. In this regard, the rules consolidation module 116 may apply condition pruning (e.g., via traversal of the decision tree starting from the root and moving towards the leaves) to reduce the complexity and consolidate each application UI context element and attribute condition. That is, the rules consolidation module 116 may collapse the decision tree based on commonality between different nodes of the decision tree. The rules consolidation module 116 may consolidate the decision tree to generate the distilled rules that describe the dynamic behavior of every relevant dynamic UI attribute based on varying contexts.

With respect to distilled rules, a rule that includes several conditions may be highly complex. For example, referring to FIG. 7, a rule may be specified as "Make [Approving Manager] not-needed when [Customer Type]='Retail' and (Order Status='Open' or Order Status='In Progress' or Order Status='Completed')". In this regard, such a rule may be distilled to shorten the rule to its minimal size to retain all of the states and cases listed in the truth table generated from the True/False data of FIG. 6, which in this example may be specified as "Make [Approving Manager] Needed when [Customer Type]='Retail' and (Order Status='New' or Customer Region='West')". In this regard, the elements in the brackets (i.e., □) may represent fields or values in the fields.

Referring to FIG. 1 (see also FIG. 2, and block 308 of FIG. 3), a rules generation module 118 may generate a human readable and/or a machine readable description of each dynamic attribute of the various UI elements and the dynamic attribute condition, an example of which is disclosed herein with reference to FIG. 8.

For example, FIG. 8 illustrates a result output for the apparatus 102, according to an example of the present disclosure.

Referring to FIG. 8, for the example of FIGS. 4-7, the rules generation module 118 may generate human readable descriptions of each dynamic attribute of the various UI elements and the dynamic attribute condition as illustrated at 800-808.

According to examples, at 800, the human readable rule may be specified as "Approving Manager field is needed when Customer Type is Retail and (Order Status is New or Customer Region is West)", or similarly specified at 802 as "Make [Approving Manager] needed when [Customer Type] ='Retail' and (Order Status='New' or Customer Region='West')", where "Customer Type", "Order Status", and "Customer Region" may represent context elements from FIG. 4. According to another example, at 804, the human readable rule may be specified as "Make [Partner Code] field Needed when [Customer Type] is [Partner]". According to another example, at 806, the human readable rule may be specified as "Make [Customer Name] field Read when [UserGroup] is not [Admin] and [Customer Status] is Not New". According to another example, at 808, the human readable rule may be specified as "Make [Partner Info] tab Visible when [Customer Type] is [Partner]".

Referring to FIG. 8, for the example of FIGS. 4-7, the rules generation module 118 may generate a machine readable description of each dynamic attribute of the various UI elements and the dynamic attribute condition as illustrated at 810-816.

According to examples, at 810, the machine readable description corresponding to the human readable rule at 800 and 802 may be specified as a proprietary format that a system may load and implement, for example, as:

```
"rule": {
    "field": "Approving Manager",
    "attribute": "needed",
    "condition": [
        {"customer_type": "retail","AND"
            {"order_status": "new", "OR"
        "customer_region": "west"}}
    ]
}
```

According to examples, at 812, the machine readable description corresponding to the human readable rule at 804 may be specified as a proprietary format that a system may load and implement, for example, as:

```
"rule": {
    "field": "Partner Code",
    "attribute": "needed",
    "condition": [
            {"customer_type": "partner"}
    ]
}
```

According to examples, at 814, the machine readable description corresponding to the human readable rule at 806 may be specified as a proprietary format that a system may load and implement, for example, as:

```
"rule": {
    "field": "Customer Name",
    "attribute": "read",
    "condition": [
        {"user_group": "NOT","ADMIN", "AND"}
        {"customer_status": "new"}
    ]
}
```

According to examples, at 816, the machine readable description corresponding to the human readable rule at 808 may be specified as a proprietary format that a system may load and implement, for example, as:

```
"rule": {
    "tab": "Partner Info",
    "attribute": "visible",
    "condition": [
        {"customer_type": "partner"}
    ]
}
```

Referring to FIG. 1 (see also FIG. 2, and block 310 of FIG. 3), a rules incorporation module 120 may incorporate the rules 114 directly into a new version of the application 108. In this regard, the rules incorporation module 120 may utilize the machine readable description as disclosed herein with reference to FIG. 8 to incorporate the rules 114 directly into a new version of the application 108.

The modules and other elements of the apparatus 100 may be machine readable instructions stored on a non-transitory computer readable medium. In this regard, the apparatus 100 may include or be a non-transitory computer readable medium. In addition, or alternatively, the modules and other elements of the apparatus 100 may be hardware or a combination of machine readable instructions and hardware.

Figure 9:
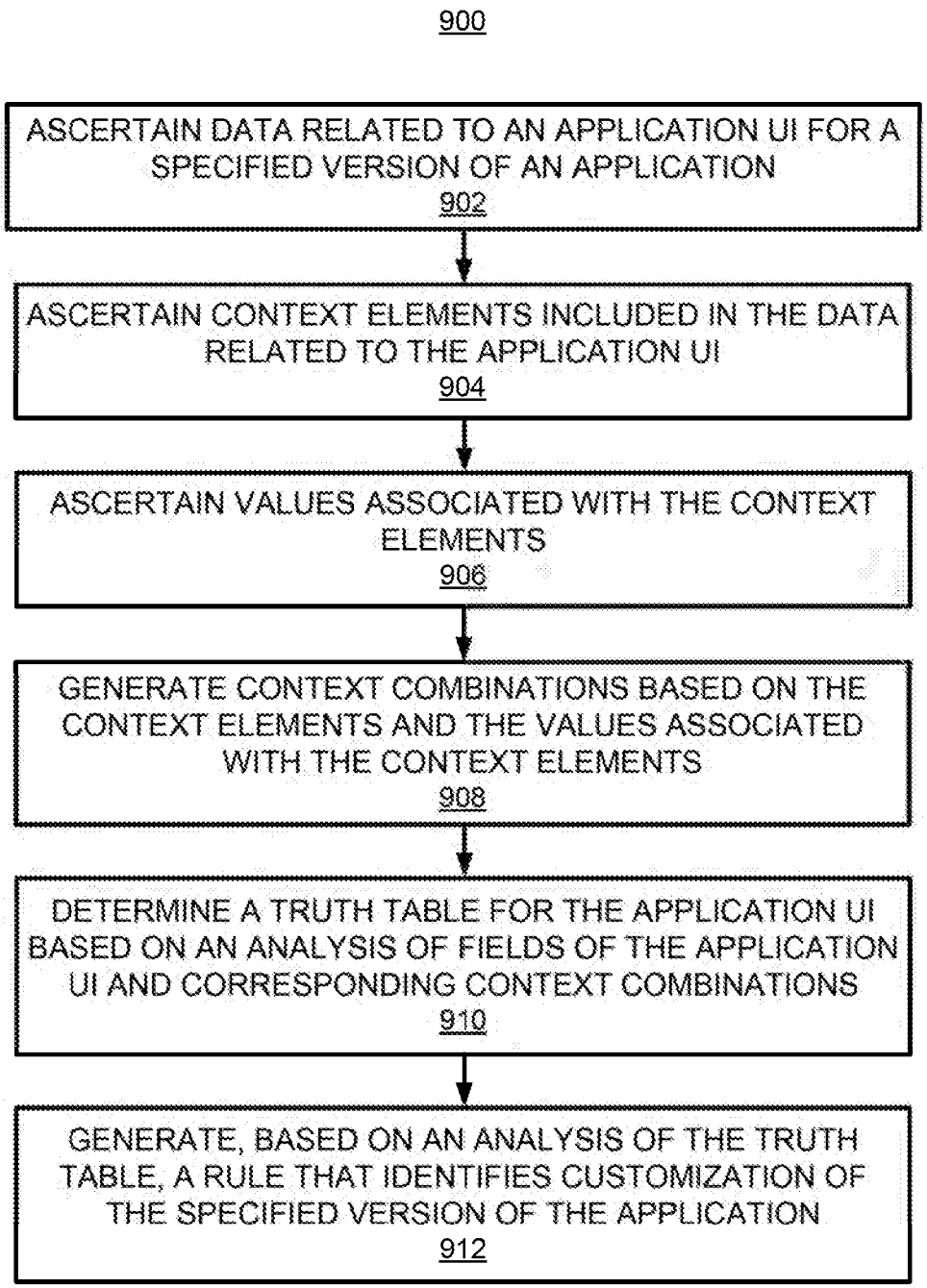
FIG. 9 illustrates a flowchart of a method for UI behavior based rules generation, according to an example of the present disclosure.
Figure 10:
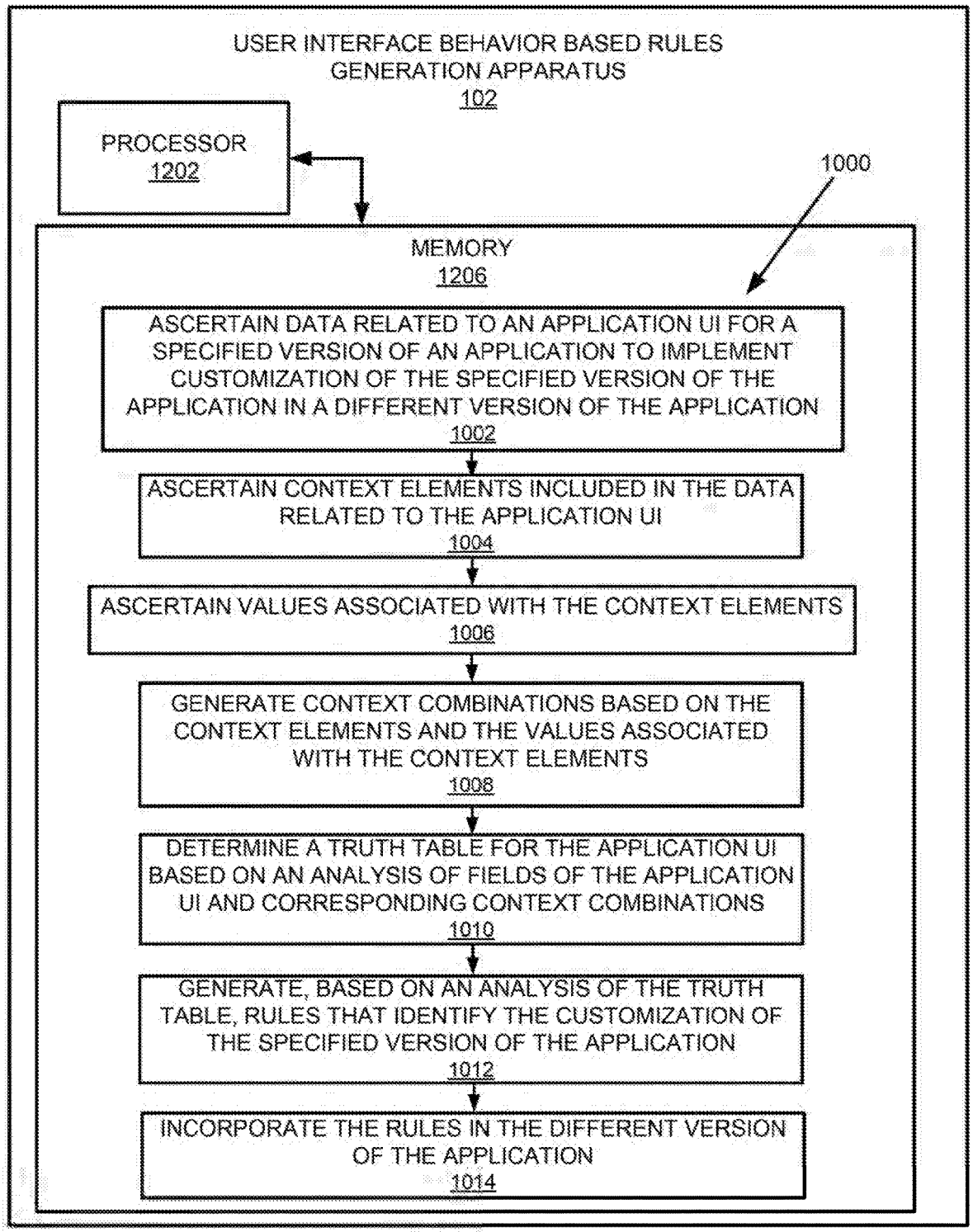
FIG. 10 illustrates another flowchart of a method for UI behavior based rules generation, according to an example of the present disclosure.
Figure 11:
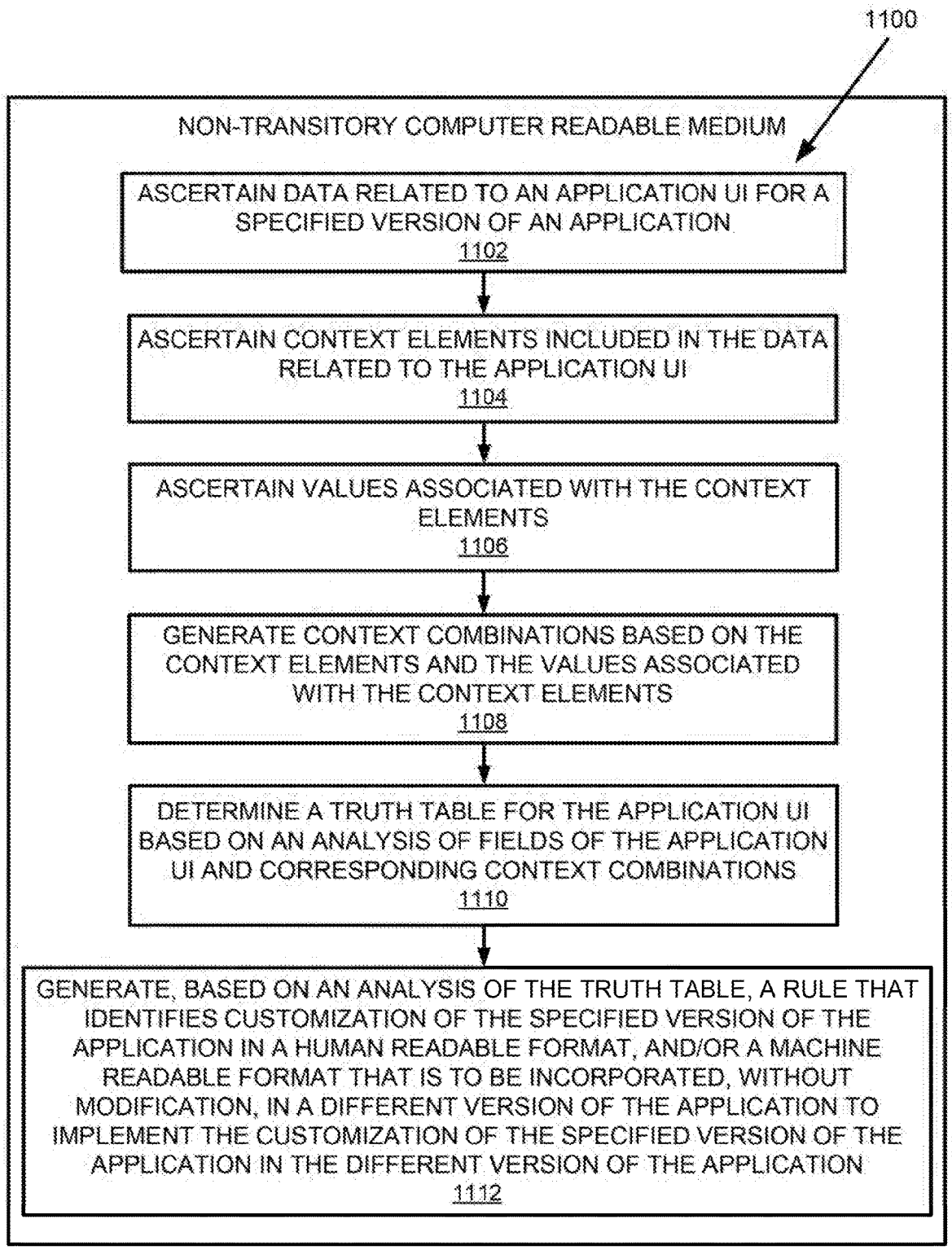
FIG. 11 illustrates another flowchart of a method for UI behavior based rules generation, according to an example of the present disclosure.

FIGS. 9-11 respectively illustrate flowcharts of methods 900, 1000, and 1100 for UI behavior based rules generation, corresponding to the example of the UI behavior based rules generation apparatus 100 whose construction is described in detail above. The methods 900, 1000, and 1100 may be implemented on the UI behavior based rules generation apparatus 100 with reference to FIGS. 1-8 by way of example and not limitation. The methods 900, 1000, and 1100 may be practiced in other apparatus.

Further, although execution of the methods described herein is with reference to the apparatus 100 of FIG. 1, other suitable devices for execution of these methods will be apparent to those of skill in the art. The methods described in the flowcharts of FIG. 9-11 may be implemented in the form of executable instructions stored on a machine-readable storage medium, such as the memory 1206 and/or the secondary data storage 1208 of FIG. 12, by one or more modules described herein, and/or in the form of electronic circuitry.

Referring to FIGS. 1-9, and particularly FIG. 9, for the method 900, at block 902, the method may include ascertaining data related to an application UI 106 for a specified version of an application 108.

At block 904, the method may include ascertaining context elements 110 included in the data related to the application UI 106.

At block 906, the method may include ascertaining values (e.g., see FIG. 4) associated with the context elements 110.

At block 908, the method may include generating context combinations (e.g., see FIG. 5) based on the context elements 110 and the values associated with the context elements 110.

At block 910, the method may include determining a truth table (e.g., see FIG. 6) for the application UI 106 based on an analysis of fields of the application UI 106 and corresponding context combinations.

At block 912, the method may include generating, based on an analysis of the truth table, a rule 114 (e.g., see FIG. 8) that identifies customization of the specified version of the application 108.

According to examples, the method 900 may include incorporating the rule 114 in a different version of the application 108 to implement the customization of the specified version of the application 108 in the different version of the application 108.

According to examples, the method 900 may include ascertaining attributes of the fields of the application UI 106 and the corresponding context combinations, and determining the truth table for the application UI 106 based on the analysis of the fields of the application UI 106, the attributes of the fields of the application UI 106 and the corresponding context combinations, the corresponding context combinations.

According to examples, for the method 900, generating, based on the analysis of the truth table, the rule 114 that identifies customization of the specified version of the application 108, may include generating, based on the analysis of the truth table, a decision tree (e.g., see FIG. 7) that represents a condition of each of the attributes and an associated context element of the context elements 110, and generating, based on an analysis of the decision tree, the rule 114 that identifies customization of the specified version of the application 108.

According to examples, the method 900 may include consolidating the decision tree to consolidate each of the attributes and the associated context element of the context elements 110.

According to examples, the rule 114 may represent an expanded rule, and the method 900 may include generating, based on an analysis of the consolidated decision tree, a distilled rule 114 that identifies customization of the specified version of the application 108. The distilled rule 114 may include a minimal size and/or minimal conditions compared to the expanded rule.

According to examples, for the method 900, generating, based on the analysis of the truth table, the rule 114 that identifies customization of the specified version of the application 108, may include generating, based on the analysis of the truth table, a human readable format of the rule 114 that identifies customization of the specified version of the application 108.

According to examples, for the method 900, generating, based on the analysis of the truth table, the rule 114 that identifies customization of the specified version of the application 108, may include generating, based on the analysis of the truth table, a machine readable format of the rule 114 that identifies customization of the specified version of the application 108.

According to examples, the method 900 may include incorporating, without modification, the rule 114 in the machine readable format in a different version of the application 108 to implement the customization of the specified version of the application 108 in the different version of the application 108.

Referring to FIG. 10, for the method 1000, at block 1002, the method may include ascertaining data related to an application UI 106 for a specified version of an application 108 to implement customization of the specified version of the application 108 in a different version of the application 108.

At block 1004, the method may include ascertaining context elements 110 included in the data related to the application UI 106.

At block 1006, the method may include ascertaining values associated with the context elements 110.

At block 1008, the method may include generating context combinations based on the context elements 110 and the values associated with the context elements 110.

At block 1010, the method may include determining a truth table for the application UI 106 based on an analysis of fields of the application UI 106 and corresponding context combinations.

At block 1012, the method may include generating, based on an analysis of the truth table, rules that identify the customization of the specified version of the application 108.

At block 1014, the method may include incorporating the rules in the different version of the application 108.

According to examples, for the method 1000, generating context combinations based on the context elements 110 and the values associated with the context elements 110, may include generating the context combinations based on each of the context elements 110 and each of the values associated with the context elements 110.

According to examples, the method 1000 may include ascertaining attributes of the fields of the application UI 106 and the corresponding context combinations, and determining the truth table for the application UI 106 based on the analysis of the fields of the application UI 106, the attributes of the fields of the application UI 106 and the corresponding context combinations, the corresponding context combinations.

According to examples, for the method 1000, generating, based on the analysis of the truth table, the rules that identify the customization of the specified version of the application 108, may include generating, based on the analysis of the truth table, a decision tree that represents a condition of each of the attributes and an associated context element of the context elements 110, and generating, based on an analysis of the decision tree, the rules that identify the customization of the specified version of the application 108.

Referring to FIG. 11, for the method 1100, at block 1102, the method may include ascertaining data related to an application UI 106 for a specified version of an application 108.

At block 1104, the method may include ascertaining context elements 110 included in the data related to the application UI 106.

At block 1106, the method may include ascertaining values associated with the context elements 110.

At block 1108, the method may include generating context combinations based on the context elements 110 and the values associated with the context elements 110.

At block 1110, the method may include determining a truth table for the application UI 106 based on an analysis of fields of the application UI 106 and corresponding context combinations.

At block 1112, the method may include generating, based on an analysis of the truth table, a rule 114 that identifies customization of the specified version of the application 108 in a human readable format, and/or a machine readable format that is to be incorporated, without modification, in a different version of the application 108 to implement the customization of the specified version of the application 108 in the different version of the application 108.

According to examples, for the method 1100, generating, based on the analysis of the truth table, the expanded rule 114 that identifies customization of the specified version of the application 108, may include generating, based on an analysis of a consolidated decision tree related to the truth table, a distilled rule 114 that identifies customization of the specified version of the application 108. The distilled rule 114 may include a minimal size and/or minimal conditions compared to the expanded rule.

Figure 12:
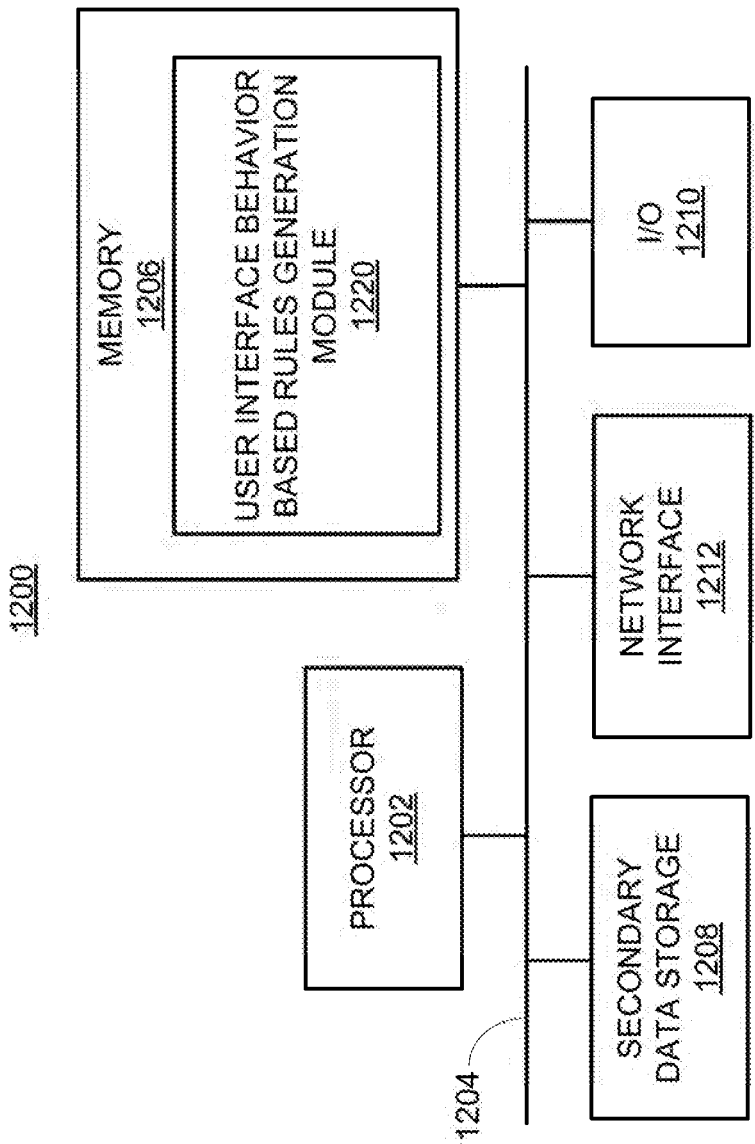
FIG. 12 illustrates a computer system, according to an example of the present disclosure.

FIG. 12 shows a computer system 1200 that may be used with the examples described herein. The computer system 1200 may represent a generic platform that includes components that may be in a server or another computer system. The computer system 1200 may be used as a platform for the apparatus 100. The computer system 1200 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 1200 may include a processor 1202 that may implement or execute machine readable instructions performing some or all of the methods, functions and other processes described herein. Commands and data from the processor 1202 may be communicated over a communication bus 1204. The computer system may also include a main memory 1206, such as a random access memory (RAM), where the machine readable instructions and data for the processor 1202 may reside during runtime, and a secondary data storage 1208, which may be non-volatile and stores machine readable instructions and data. The memory and data storage are examples of computer readable mediums. The memory 1206 may include a UI behavior based rules generation module 1220 including machine readable instructions residing in the memory 1206 during runtime and executed by the processor 1202. The UI behavior based rules generation module 1220 may include the modules of the apparatus 100 shown in FIG. 1.

The computer system 1200 may include an I/O device 1210, such as a keyboard, a mouse, a display, etc. The computer system may include a network interface 1212 for connecting to a network. Other known electronic components may be added or substituted in the computer system.

The foregoing disclosure describes a number of examples for UI behavior based rules generation. The disclosed examples may include systems, devices, computer-readable storage media, and methods for UI behavior based rules generation. For purposes of explanation, certain examples are described with reference to the components illustrated in FIGS. 1-12. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-12 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

What is claimed is:

1. A method for user interface (UI) behavior based rules generation, the method comprising:
   capturing, by a hardware processor, data on an application UI for a customization of a specified version of an application;
   ascertaining context types included in the data captured on the application UI;
   ascertaining values of the context types included in the data captured on the application UI;
   generating all possible context combinations of the values of the context types included in the data captured on the application UI, wherein each context combination of the generated all possible context combinations includes respective values of all of the context types;
   determining a truth table for attributes of the application UI by applying true or false decisions on the respective values in each context combination of the generated all possible context combinations, and generating the attributes of the application UI in the truth table based on results of the true or false decisions on the respective values in each context combination of the generated all possible context combinations;
   based on applying a technique of a decision tree on the attributes of the application UI in the truth table, generating rules that describe the data captured on the application UI, wherein the generated rules include conditions of the attributes and the context types for automatically providing a particular value to one of the context types, wherein generating the rules that describe the data captured on the application UI comprises generating, based on an analysis of the attributes of the application UI in the truth table, a machine readable format of the rules that represent the customization of the specified version of the application;
   consolidating the generated rules into distilled rules based on commonality between nodes of the decision tree, wherein the distilled rules represent the customization of the specified version of the application; and
   incorporating, without modification, the rules in the machine readable format in a different version of the application to implement the customization of the specified version of the application in the different version of the application.

2. The method according to claim 1, further comprising:
   incorporating the distilled rules in a different version of the application to implement the customization of the specified version of the application in the different version of the application.

3. The method according to claim 1, further comprising:
   consolidating the attributes of the application UI in the truth table based on a commonality among the attributes.

4. The method according to claim 1, wherein the generating rules that describe the data captured on the application UI comprises:
   generating, based on an analysis of the attributes of the application UI in the truth table, the decision tree that represents the conditions of the attributes and the context types; and
   generating, based on an analysis of the decision tree, the rules that represent the customization of the specified version of the application.

5. The method according to claim 4, further comprising:
   consolidating the decision tree by traversing from a root node to leaf nodes of the decision tree to consolidate each of the attributes and an associated context type of the context types.

6. The method according to claim 5, wherein the method further comprises:
   generating, based on an analysis of the consolidated decision tree, the distilled rules that represent the customization of the specified version of the application, wherein the distilled rules include at least one of a minimal size and minimal conditions compared to expanded rules.

7. The method according to claim 1, wherein generating the rules that describe the data captured on the application UI comprises:
   generating, based on an analysis of the attributes of the application UI in the truth table, a human readable format of the rules that represent the customization of the specified version of the application.

8. A user interface (UI) behavior based rules generation apparatus comprising:
   a processor; and
   a memory storing machine readable instructions that when executed by the processor cause the processor to:
      capture data on an application UI for a customization of a specified version of an application;
      ascertain context types included in the data captured on the application UI;
      ascertain values of the context types included in the data captured on the application UI;
      generate all possible context combinations of the values of the context types included in the data captured on the application UI, wherein each context combination of the generated all possible context combinations includes respective values of all of the context types;
      determine a truth table for attributes of the application UI by applying true or false decisions on the respective values in each context combination of the generated all possible context combinations, and generating the attributes of the application UI in the truth table based on results of the true or false decisions on the respective values in each context combination of the generated all possible context combinations;
      based on applying a technique of a decision tree on the attributes of the application UI in the truth table, generate rules that describe the data captured on the application UI, wherein the generated rules include conditions of the attributes and the context types for automatically providing a particular value to one of the context types, wherein the rules are to be incorporated in a different version of the application to implement the customization of the specified version of the application, and wherein generating the rules that describe the data captured on the application UI comprises generating, based on an analysis of the attributes of the application UI in the truth table, a machine readable format of the rules that represent the customization of the specified version of the application; consolidate the generated rules into distilled rules based on commonality between nodes of the decision tree, wherein the distilled rules represent the customization of the specified version of the application; and incorporate, without modification, the rules in the machine readable format in a different version of the application to implement the customization of the specified version of the application in the different version of the application.

9. The UI behavior based rules generation apparatus according to claim 8, wherein, prior to determining a truth table for attributes of the application UI, the machine readable instructions cause the processor to:

capture the attributes of the application UI from the generated all possible context combinations of the values of the context types, wherein the attributes of the application UI represent areas of the application UI that contain the values of the context types.

10. The UI behavior based rules generation apparatus according to claim 8, wherein the machine readable instructions that when executed by the processor further cause the processor to:

consolidate the attributes of the application UI in the truth table based on a commonality among the attributes.

11. The UI behavior based rules generation apparatus according to claim 8, wherein the machine readable instructions to generate the rules that identify the customization of the specified version of the application, further comprise machine readable instructions that when executed by the processor further cause the processor to:

generate, based on an analysis of the attributes of the application UI in the truth table, the decision tree that represents the conditions of the attributes and the context types; and generate, based on an analysis of the decision tree, the rules that identify the customization of the specified version of the application.

12. The UI behavior based rules generation apparatus according to claim 11, wherein the machine readable instructions that cause the processor to generate the rules further comprise machine readable instructions that cause the processor to:

consolidate the decision tree by traversing from a root node to leaf nodes of the decision tree to consolidate each of the attributes and an associated context type of the context types.

13. The UI behavior based rules generation apparatus according to claim 8, wherein the rules that describe the data captured on the application UI are in a human readable format.

14. The UI behavior based rules generation apparatus according to claim 8, wherein the rules that describe the data captured on the application UI are in a machine readable format.

15. A non-transitory computer readable medium having stored thereon machine readable instructions to provide user interface (UI) behavior based rules generation, wherein the machine readable instructions, when executed, cause a processor to:

capture data on an application UI for a customization of a specified version of an application;
ascertain context types included in the data captured on the application UI;
ascertain values of the context types included in the data captured on the application UI;
generate all possible context combinations of the values of the context types included in the data captured on the application UI, wherein each context combination of the generated all possible context combinations includes respective values of all of the context types;
determine a truth table for attributes of the application UI by applying true or false decisions on the respective values in each context combination of the generated all possible context combinations, and generating the attributes of the application UI in the truth table based on results of the true or false decisions on the respective values in each context combination of the generated all possible context combinations;
based on an application of a technique of a decision tree on the attributes of the application UI in the truth table, generate rules that describe the data captured on the application UI, wherein generating the rules that describe the data captured on the application UI comprises generating, based on an analysis of the attributes of the application UI in the truth table, a machine readable format of the rules that represent the customization of the specified version of the application and wherein the rules include conditions of the attributes and the context types for automatically providing a particular value to one of the context types, and wherein the rules in a machine readable format that are to be incorporated, without modification, in a different version of the application to implement the customization of the specified version of the application in the different version of the application; and consolidating the generated rules into distilled rules based on commonality between nodes of the decision tree, wherein the distilled rules represent the customization of the specified version of the application.

16. The non-transitory computer readable medium according to claim 15, wherein the generated rules represent expanded rules, and wherein the machine readable instructions to generate the rules that describe the data captured on the application UI, comprise machine readable instructions that, when executed, further cause the processor to:

generate, based on an analysis of a consolidated decision tree related to the truth table, the distilled rules that represent the customization of the specified version of the application, wherein the distilled rules include at least one of a minimal size and minimal conditions compared to the expanded rules.

17. The non-transitory computer readable medium according to claim 15, wherein the machine readable instructions further cause the processor to:

consolidate the attributes of the application in the truth table based on a commonality among the attributes.

18. The non-transitory computer readable medium according to claim 15, wherein the machine readable instructions that cause the processor to generate the rules that describe the data captured on the application UI include machine readable instructions that cause the processor to:

generate, based on an analysis of the attributes of the application UI in the truth table, the decision tree that represents the conditions of the attributes and the context types;

consolidate the decision tree by traversing from a root node to leaf nodes of the decision tree to consolidate the attributes and the context types; and generate, based on an analysis of the consolidated decision tree, the rules that represent the customization of the specified version of the application.

* * * * *